(12) United States Patent
Yang et al.

(10) Patent No.: US 11,601,940 B2
(45) Date of Patent: Mar. 7, 2023

(54) METHODS TO CONFIGURE UPLINK CANCELLATION INDICATION FOR SUPPLEMENTARY UPLINK CARRIERS

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/111,389

(22) Filed: Dec. 3, 2020

(65) Prior Publication Data

US 2021/0176752 A1   Jun. 10, 2021

Related U.S. Application Data

(60) Provisional application No. 62/943,768, filed on Dec. 4, 2019.

(51) Int. Cl.
*H04W 72/04* (2009.01)
*H04W 72/0453* (2023.01)
(Continued)

(52) U.S. Cl.
CPC ....... *H04W 72/0453* (2013.01); *H04L 5/0044* (2013.01); *H04W 76/27* (2018.02)

(58) Field of Classification Search
CPC ............ H04W 72/0453; H04W 76/27; H04W 72/1289; H04W 72/1268; H04W 76/11;
(Continued)

(56) References Cited

U.S. PATENT DOCUMENTS

2021/0037554 A1   2/2021   Kim et al.
2021/0144799 A1*  5/2021   Babaei ............... H04W 76/11
2022/0150036 A1*  5/2022   Ye ..................... H04W 72/0453

FOREIGN PATENT DOCUMENTS

WO    2019194589 A1   10/2019
WO    2020227687 A1   11/2020

OTHER PUBLICATIONS

Asia Pacific Telecom: "Considerations on UL Inter-UE Prioritization and Multiplexing", R1-1912254, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823325, 6 Pages, Retrieved from the Internet: URL:https://ftp.3gpp.org/tsg_ran/WG1_RL1/TSGR1_99/Docs/R1-1912254.zip R1-1912254 [retrieved on Nov. 9, 2019] p. 4, Proposal 4.
(Continued)

*Primary Examiner* — Vinncelas Louis
(74) *Attorney, Agent, or Firm* — Procopio, Cory, Hargreaves & Savitch LLP

(57) ABSTRACT

Aspects are presented which enable a UE to determine a supplementary uplink (SUL) configuration for an uplink cancellation indication (ULCI) for cancelling uplink communications in SUL. The UE receives from a base station a first configuration associated with a first block of an ULCI and associated with at least one of a SUL carrier a non-supplementary uplink (NUL) carrier in a cell. The base station configures the UE with a second configuration associated with a second block of the ULCI and associated with a SUL carrier in the cell, and the UE determines the second configuration. The UE monitors the ULCI based on the first configuration and the second configuration.

33 Claims, 11 Drawing Sheets

(51) Int. Cl.
*H04W 76/27* (2018.01)
*H04L 5/00* (2006.01)

(58) Field of Classification Search
CPC ... H04L 5/0044; H04L 5/0051; H04L 5/0055; H04L 5/001; H04L 5/0053
See application file for complete search history.

(56) References Cited

OTHER PUBLICATIONS

International Search Report and Written Opinion—PCT/US2020/063470—ISA/EPO—dated Mar. 9, 2021.
Wi Rapporteur (Huawei): "RAN1 Agreements for Rel-16 eURLLC", 3GPP Draft, R1-1913603, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 28, 2019 (Nov. 28, 2019), XP051831732, 40 Pages, Retrieved from the Internet: URL:https://ftp.3gpp.org/tsg_ran/WG1_RL1/TSGR1_99/Docs/R1-1913603.zip, R1-1913603.docx [retrieved on Nov. 28, 2019] p. 34.

* cited by examiner

METHODS TO CONFIGURE UPLINK CANCELLATION INDICATION FOR SUPPLEMENTARY UPLINK CARRIERS

CROSS REFERENCE TO RELATED APPLICATION(S)

This application claims the benefit of U.S. Provisional Application Ser. No. 62/943,768, entitled "METHODS TO CONFIGURE UPLINK CANCELLATION INDICATION FOR SUPPLEMENTARY UPLINK CARRIERS" and filed on Dec. 4, 2019, which is expressly incorporated by reference herein in its entirety.

BACKGROUND

Technical Field

The present disclosure relates generally to communication systems, and more particularly, to wireless communication systems between a user equipment (UE) and a base station (BS).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

After a base station schedules resources for a UE to use in transmission or reception, e.g., of enhanced mobile broadband (eMBB) data, the base station may become aware of a more urgent, higher priority transmission from another UE. For example, the other transmission may be from a latency sensitive device utilising ultra-reliable, low latency communication (URLLC). In such circumstances, the base station may reclaim the resources previously scheduled to the first, lower priority UE for use by the second, higher priority UE. In particular, if the previously scheduled resources are for a downlink transmission, the base station may send a downlink cancellation indication (DLCI) (or downlink preemption indication) in a DLCI occasion to the first UE cancelling at least a portion of the downlink transmission to that UE. Similarly, if the previously scheduled resources are for an uplink transmission, the base station may send an uplink cancellation indication (ULCI) (or uplink preemption indication) in an ULCI occasion to the first UE to cancel at least a portion of the uplink transmission from that UE. The base station may then allocate those reclaimed resources to the higher priority, latency sensitive UE.

Additionally, a UE may be configured with two uplink carriers in the same uplink serving cell, namely a supplementary uplink (SUL) carrier and a non-supplementary uplink (NUL) carrier, and the base station may semi-statically or dynamically schedule uplink transmissions on either the NUL or SUL. When the base station sends ULCI to the UE to cancel a previously scheduled uplink transmission, the UE may determine whether to apply the ULCI to cancel uplink transmissions on NUL or SUL. For example, the base station may configure the UE to monitor separate blocks or fields in ULCI, where each block corresponds to either the SUL carrier and/or NUL carrier of a given cell where the uplink transmission to be punctured is carried. The portion of the uplink transmission to be canceled is based on various parameters (e.g., carrier, time domain resource granularity, symbols, etc.) configured for the UE.

Currently, a UE may receive a NUL configuration for ULCI in a serving cell, including a corresponding location of fields in the DCI for NUL (e.g., a NUL position parameter), a number of bits for applying the ULCI to NUL (e.g., a NUL size parameter), and an indication for time-frequency resources of the ULCI in NUL. The UE may also receive a corresponding location of fields in the DCI for SUL (e.g., a SUL position parameter) for ULCI in the serving cell. However, under the current configuration, the UE is not configured with a corresponding SUL CI payload size parameter and SUL time-frequency resources for ULCI. Thus, a UE monitoring for a block in ULCI corresponding to SUL may not be able to determine the subset of SUL resources in which to apply ULCI, in contrast to NUL. It would therefore be desirable to enable a UE to determine the subset of SUL resources for applying ULCI. Aspects presented herein enable the UE to determine a SUL configuration, including the SUL CI payload size parameter and time-frequency resources, to determine the subset of resources for cancelling uplink communications in SUL.

In an aspect of the disclosure, a method, a computer-readable medium, and an apparatus are provided. The apparatus may be a UE. The apparatus may receive from a base station, a first configuration associated with a first block of an uplink cancellation indication (ULCI), where the first configuration is associated with at least one of a supplementary uplink (SUL) carrier or a non-supplementary uplink (NUL) carrier in a cell. The apparatus may determine a second configuration associated with a second block of the ULCI, where the second configuration is associated with the SUL carrier in the cell. The apparatus may monitor the ULCI based on the first configuration and the second configuration.

In another aspect of the disclosure, a method, a computer-readable medium, and an apparatus are provided. The apparatus may be a base station. The apparatus may transmit, to a user equipment (UE), a first configuration associated with a first block of an uplink cancellation indication (ULCI), where the first configuration is associated with at least one of a supplementary uplink (SUL) carrier or a non-supplementary uplink (NUL) carrier in a cell. The apparatus configures the UE with a second configuration associated with a second block of the ULCI, where the second configuration is associated with the SUL carrier in the cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
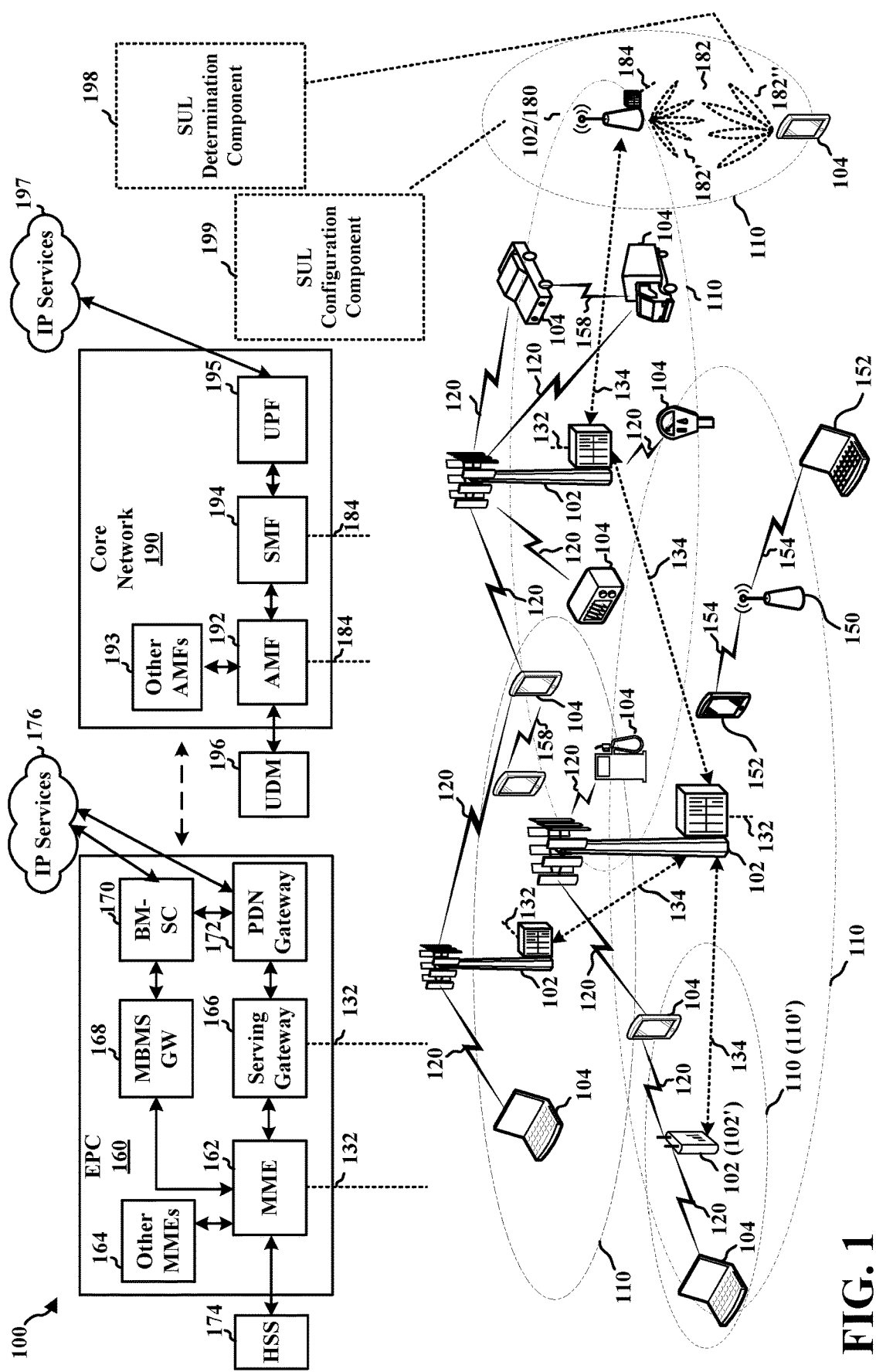
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a SUL determination component 198 configured to receive, from a base station, a first configuration associated with a first block of an uplink cancellation indication (ULCI), where the first configuration is associated with at least one of a supplementary uplink (SUL) carrier or a non-supplementary uplink (NUL) carrier in a cell; determine a second configuration associated with a second block of the ULCI, where the second configuration is associated with the SUL carrier in the cell; and monitor the ULCI based on the first configuration and the second configuration.

Referring again to FIG. 1, in certain aspects, the base station 180 may include a SUL configuration component 199 configured to transmit, to a user equipment (UE), a first configuration associated with a first block of an uplink cancellation indication (ULCI), where the first configuration is associated with at least one of a supplementary uplink (SUL) carrier or a non-supplementary uplink (NUL) carrier in a cell; and configure the UE with a second configuration associated with a second block of the ULCI, where the second configuration is associated with the SUL carrier in the cell. Although the following description may be focused on 5G NR, the concepts described herein may be applicable to other similar areas, such as LTE, LTE-A, CDMA, GSM, and other wireless technologies.

Figure 2:
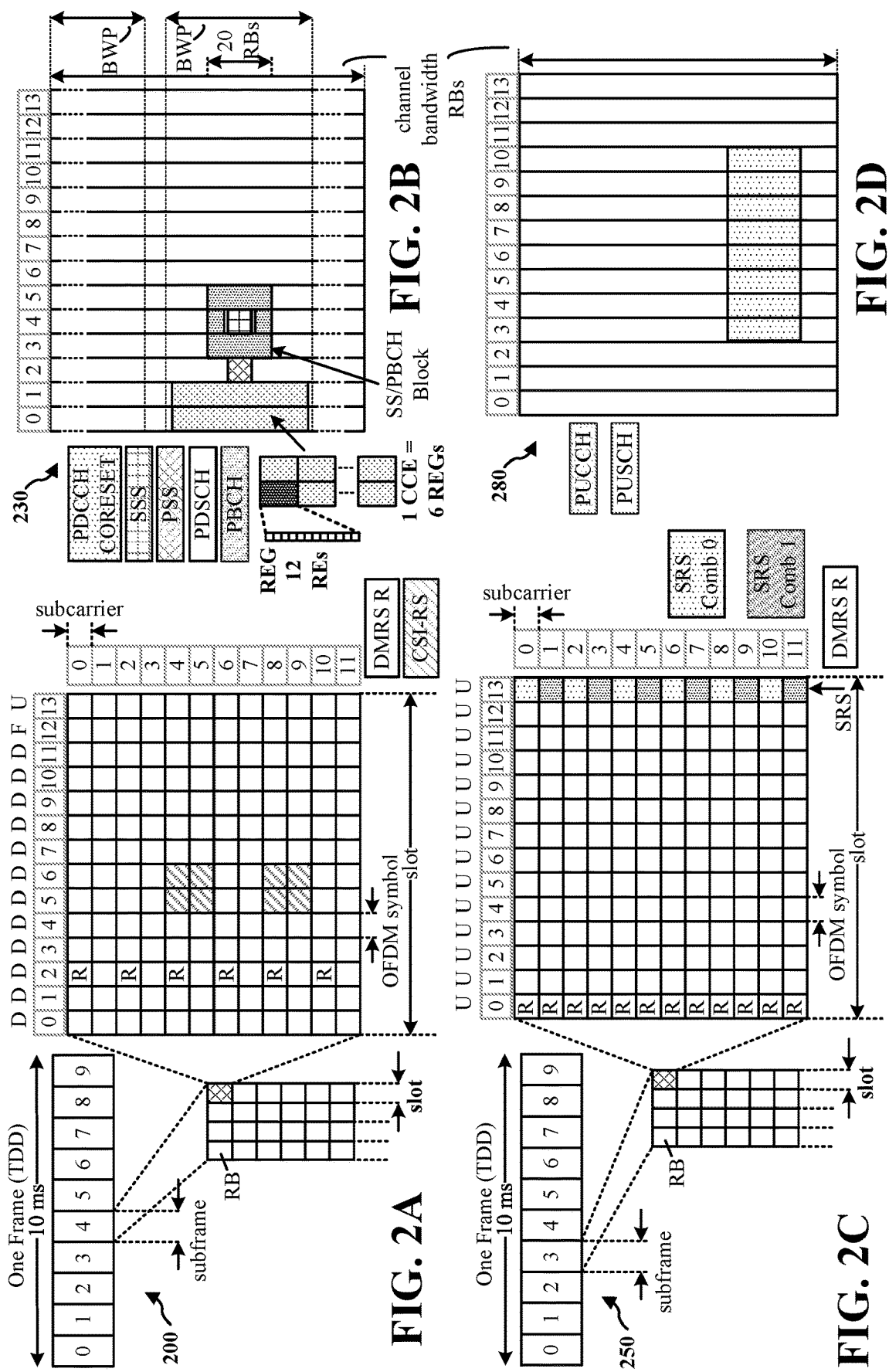
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
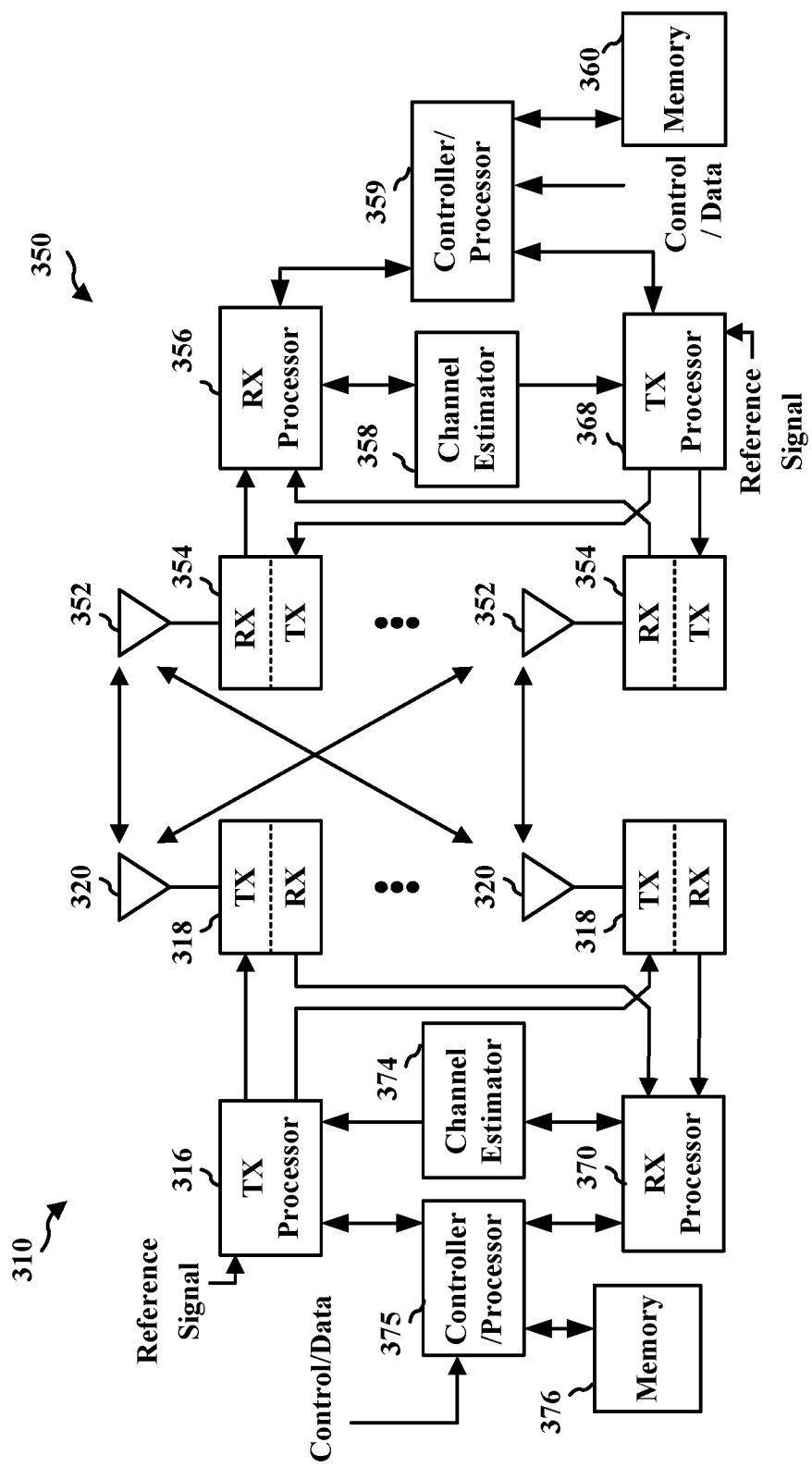
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some aspects of wireless communications, after a base station schedules resources for a UE to use in transmission or reception, e.g., of enhanced mobile broadband (eMBB) data, the base station may become aware of a more urgent, higher priority transmission from another UE. For example, the other transmission may be from a latency sensitive device utilising ultra-reliable, low latency communication (URLLC). In such circumstances, the base station may reclaim the resources previously scheduled to the first, lower priority UE for use by the second, higher priority UE. In particular, if the previously scheduled resources are for a downlink transmission, the base station may send a downlink cancellation indication (DLCI) (or downlink preemption indication) in a DLCI occasion to the first UE cancelling at least a portion of the downlink transmission to that UE. Similarly, if the previously scheduled resources are for an uplink transmission, the base station may send an uplink cancellation indication (ULCI) (or uplink preemption indication) in an ULCI occasion to the first UE to cancel at least a portion of the uplink transmission from that UE. The base station may then allocate those reclaimed resources to the higher priority, latency sensitive UE.

Figure 4:
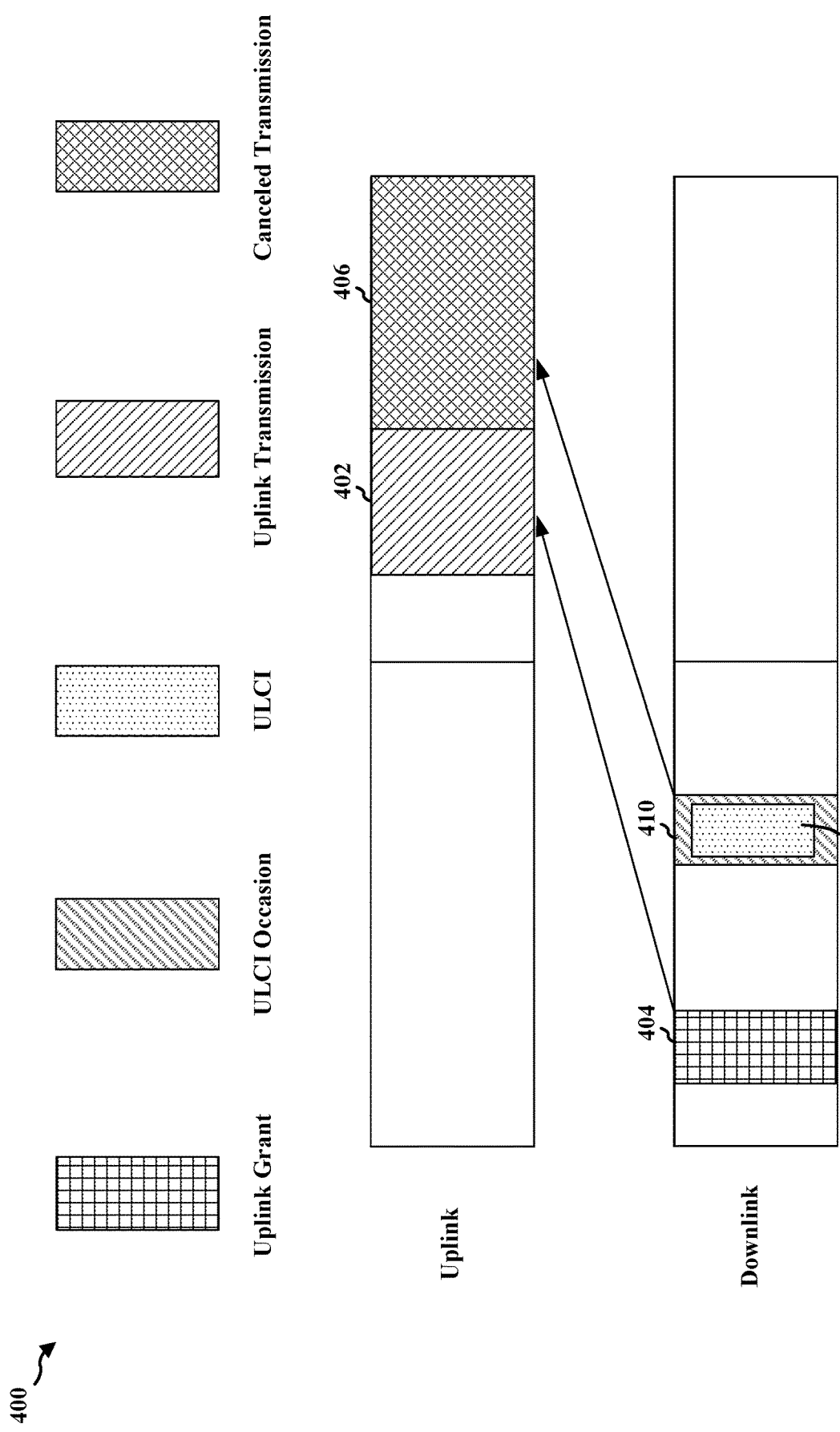
FIG. 4 is a diagram illustrating the allocation of resources for an uplink transmission of a UE based on an uplink grant received from a base station.

For example, FIG. 4 illustrates an example of a diagram 400 illustrating the allocation of resources for an uplink transmission 402 of a UE based on an uplink grant 404 received from a base station. If the base station later becomes aware of a latency sensitive UE which utilizes at least a portion 406 of the allocated resources for the uplink transmission 402 for URLLC data or other higher priority data, the base station may transmit a ULCI 408 in a ULCI occasion 410 to the UE indicating that the portion 406 of the previously granted resources for the uplink transmission will be punctured for use by the latency sensitive UE. As a result, the UE may cancel its uplink transmission during portion 406 for use by the other UE.

Figure 5:
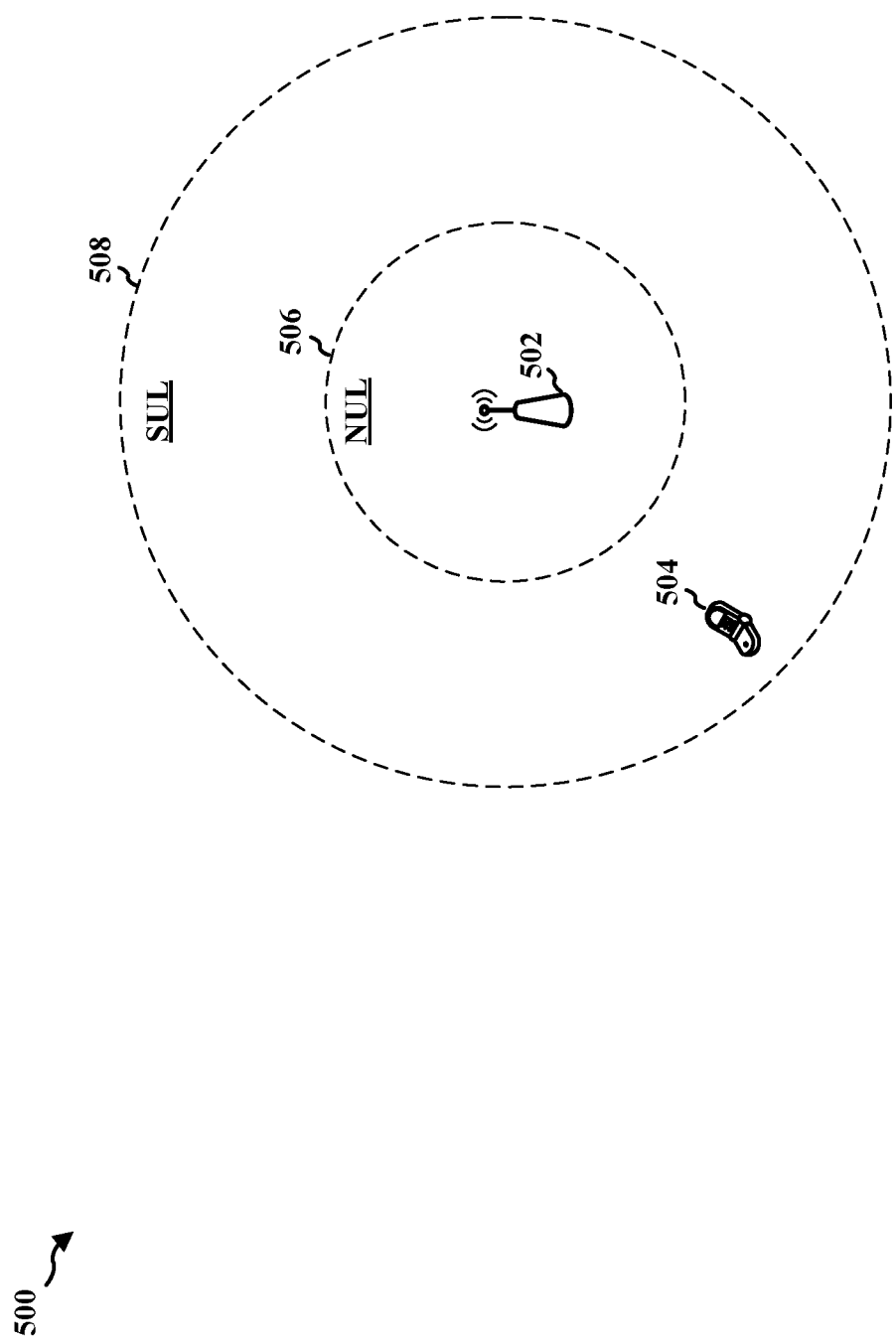
FIG. 5 is a diagram of an example serving cell including a NUL and SUL carrier for a UE.

Additionally, a UE may be configured with two uplink carriers in the same uplink serving cell, namely a supplementary uplink (SUL) carrier and a non-supplementary uplink (NUL) carrier, and the base station may semi-statically or dynamically schedule uplink transmissions on either the NUL or the SUL. FIG. 5 illustrates an example serving cell 500 in which a base station 502 may communicate with a UE 504 over a NUL carrier 506 and a SUL carrier 508. The NUL carrier 506 and SUL carrier 508 may be located on different frequencies; for example, the NUL carrier 506 may be located at a higher frequency than SUL carrier 508. The NUL carrier 506 and the SUL carrier 508 may have different ranges, as illustrated in FIG. 5. The base station 502 may send an uplink grant to the UE 504 to communicate on either the NUL or the SUL; the UE may not simultaneously transmit uplink communications on the NUL and the SUL. For example, in a serving cell, the UE may be dynamically or semi-statically indicated by the base station to transmit PUSCH, SRS, PUCCH, or other uplink communications on either the NUL or the SUL.

When the base station sends ULCI to the UE to cancel a previously scheduled uplink transmission, the UE may determine whether to apply the ULCI to cancel uplink transmissions on NUL or SUL. For example, the base station may configure the UE to monitor separate blocks or fields in ULCI, where each block corresponds to either the SUL carrier and/or NUL carrier of a given cell where the uplink transmission to be punctured is carried. Also, ULCI may comprise multiple blocks. The UE may be configured in the DCI with the length of ULCI and may be configured to monitor a block corresponding to the SUL carrier, a block corresponding to the NUL carrier, or a block corresponding together to the SUL and NUL carriers. The UE may apply ULCI (e.g., cancel at least a portion of the uplink transmission) on the corresponding carrier (e.g., SUL or NUL) indicated in each configured block.

Figure 6:
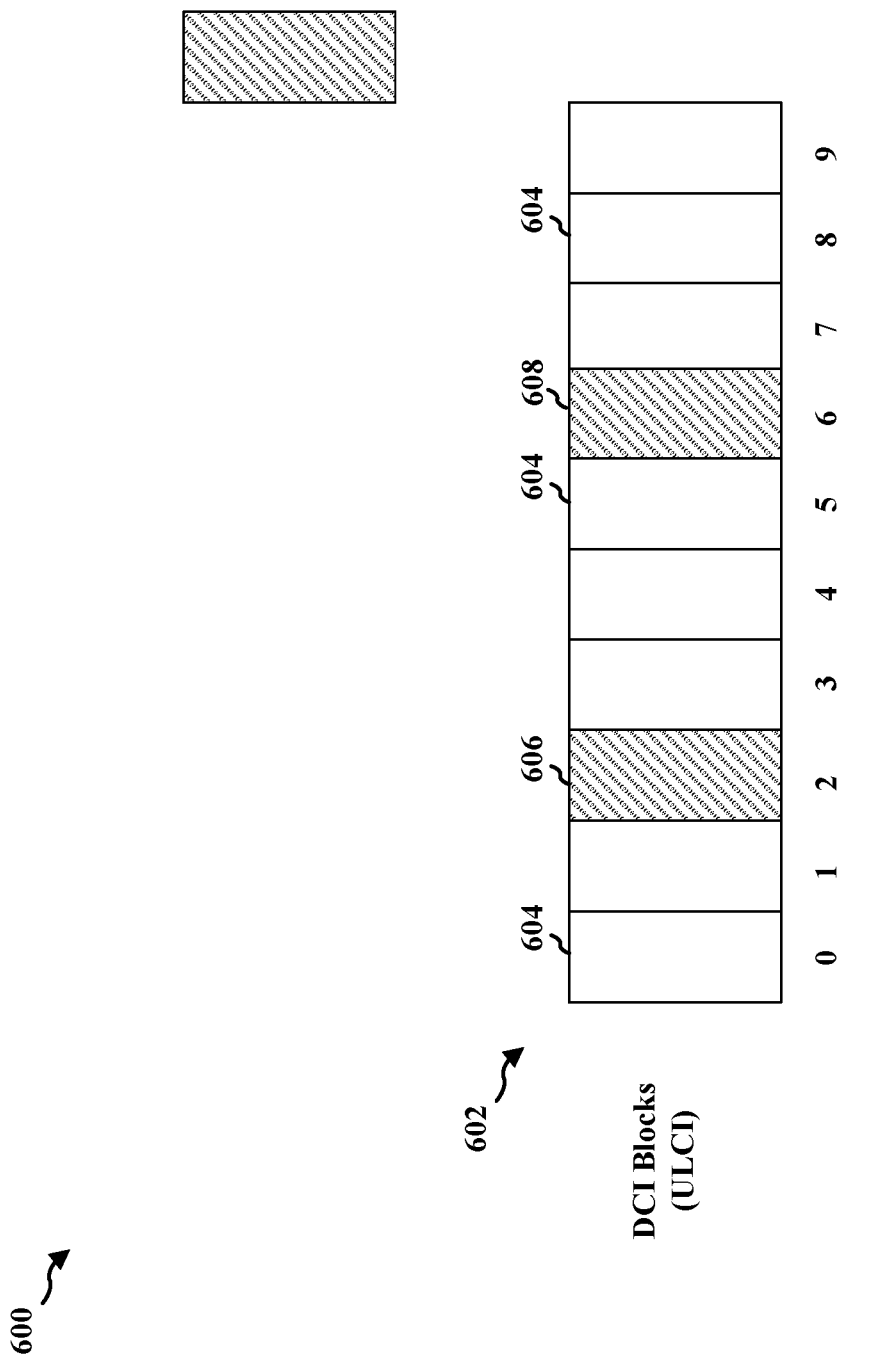
FIG. 6 is an example frame structure of a portion of downlink control information for ULCI.

FIG. 6 illustrates an example frame structure 600 of DCI comprising ULCI 602. The ULCI comprises multiple blocks 604 that may be configured for a particular cell. Each block 604 may correspond to at least one bit associated with a time domain resource granularity (e.g., a number of symbols), where '0' may indicate not to cancel an uplink transmission and '1' may indicate to cancel an uplink transmission (e.g., apply the ULCI), or vice-versa. The blocks 604 may be configured to indicate which carrier (SUL or NUL) and resources/symbols the portion of the uplink transmission are to be punctured or canceled. In one example as shown in FIG. 6, the base station may configure UE with at least one block of the ULCI. In FIG. 6, the UE may be configured to receive ULCI in block two 606 and block six 608 of the ULCI 602 structure, where block two 606 may be configured to correspond to NUL and block six 608 may be configured to correspond to SUL (or vice-versa). FIG. 6 merely illustrates a single example; any block of ULCI 602 may be configured (e.g., with 0's or 1's), and any of the blocks may be configured to correspond to a NUL carrier or a SUL carrier of a given cell. For example, the UE may apply ULCI to either the NUL carrier or SUL carrier based on which of blocks 606, 608 the ULCI instruction to cancel the transmission was received. In another example, the UE may apply ULCI received in a single block to both the NUL carrier and the SUL carrier.

When the UE receives instructions to cancel an uplink transmission in blocks 606 and/or 608, the UE may apply the ULCI to cancel at least a portion of the uplink transmission on the carrier(s) (SUL and/or NUL) and resources indicated in the blocks. The portion of the uplink transmission to be canceled is based on the various parameters (e.g., carrier, time domain resource granularity, symbols, etc.) configured for the UE. For instance, if the UE is configured based on the various parameters to receive ULCI for the NUL carrier in block 606 and for the SUL carrier in block 608, the UE may cancel the transmission on the NUL carrier when the ULCI instructions are received in block 606. The UE may cancel the transmission on the SUL carrier when the ULCI instructions are received in block 608.

As indicated above, for each serving cell, the UE may be configured with various parameters for applying the ULCI. In one example, the UE may be configured with a corresponding location of fields in the DCI for NUL. For instance, this parameter may be a NUL position parameter (e.g., posiitioninDCI or another name) in DCI format 2_4. The UE may also be configured with a corresponding location of fields in the DCI for SUL. For instance, this parameter may be a SUL position parameter (e.g., positioninDCI-forSUL or another name). Thus, in the example of FIG. 6, the NUL position parameter may correspond to block two 606, while the SUL position parameter may correspond to block six 608. In another example, the UE may be configured with a number of bits for applying the ULCI. For instance, this parameter may be a NUL size parameter (e.g., Cl-Payload-Size or another name). Referring to FIG. 6, for example, the NUL size parameter of block two 606 may be nine bits (or another number). In a further example, the UE may be configured with an indication for time-frequency resources of the ULCI. For instance, this parameter may be a NUL indication of time and frequency domain resources (e.g., timeFrequencyRegion or another name). The NUL indication may include, for example, a set of frequency domain resources on the serving cell, a number of consecutive symbols (excluding symbols for reception of SS/PBCH blocks and DL symbols indicated by a time-division-duplex configuration [e.g., tdd-UL-DL-ConfigurationCommon or another name]), and a time domain granularity of each bit in the field (e.g., timeGranularityforCl or another name). Referring to FIG. 6 and assuming an NUL size parameter of nine bits in this example, the NUL indication may indicate for example that block two 606 has a NUL time domain granularity of three bits, a NUL duration in time of three symbols, and a NUL duration in frequency of three subcarriers. In some aspects, an uplink cancelation priority field or parameter (e.g., uplinkCancellationPriority or another name) may configure uplink cancelation behavior if both ULCI and intra-UE priority indicators are configured for a given UE. If the field or parameter is present, then ULCI may be applicable to the UL transmissions indicated/configured as a low priority level. If the field or parameter is absent, ULCI may be applicable to an UL transmission irrespective of its priority level. In some instances, this parameter may be configured for the NUL. That is, a separate parameter (e.g., uplinkCancellationPriority-ForSUL or another name) may be configured for the SUL to indicate the uplink cancelation priority on the SUL. If this parameter is not configured for the SUL, the UE may follow the same behavior as the NUL (i.e., based on the existing RRC parameter uplinkCancellationPriority).

Based on the above, a UE may receive the NUL configuration (e.g., the NUL position, size, and time-frequency resources) for ULCI in a serving cell, and the SUL position for ULCI in the serving cell. For instance, a UE configured with the aforementioned example parameters may monitor for block two 606 and, when block two 606 is received, may apply ULCI across a subset of NUL resources spanning a number of symbols, e.g., three symbols, and a number of subcarriers, e.g., three subcarriers, in the serving cell. However, under the current configuration, the UE may not be configured with the cancellation indication (CI) payload size for SUL (e.g., field bit width) and SUL time-frequency resources. Thus, a UE monitoring for block six 608, for example, may not be able to determine which subset of SUL resources to apply ULCI when block six 608 is received, in contrast to NUL. The UE may also not be able to determine how many bits are contained in the block in the ULCI corresponding to SUL. It would therefore be desirable to enable a UE to determine the subset of SUL resources for applying ULCI.

Aspects presented herein enable a UE to determine a SUL configuration, including the SUL CI payload size parameter and time-frequency resources, to determine the subset of resources for cancelling uplink communications in SUL. For example, if a UE is configured with and receives the SUL position parameter described above from a base station, the UE may apply one or more of the various aspects described infra to determine the SUL configuration for ULCI. Otherwise, if the UE is not configured with the SUL position parameter, the UE may refrain from determining the SUL configuration and monitoring ULCI for the SUL.

The UE may determine the SUL configuration according to various aspects. In a first aspect, the base station may configure a separate time/frequency region and a number of bits for the SUL in a separate configuration from those of the NUL. For example, the base station may provide to the UE a SUL CI payload size parameter (e.g., CI-PayloadSize-forSUL or another name) and a SUL indication of time-frequency resources (e.g., timefrequencyRegion-forSUL or another name) as additional RRC parameters for SUL configuration. Thus, referring to FIG. 6, the UE may determine the SUL CI payload size parameter corresponding to block six 608 from an RRC parameter received from the base station, in addition to the NUL size parameter corresponding to block two 606 received from the base station. Similarly, the UE may determine the SUL time-frequency resources corresponding to block six 608 from one or more RRC parameters received from the base station in addition to the RRC parameters corresponding to the NUL (e.g., block two 606).

In this first aspect, the additional RRC parameters for the SUL configuration may be configured under the same parent RRC parameter (e.g., ci-ConfigurationPerServingCell or another name) for NUL configuration. For example, the NUL configuration parameters (e.g., the NUL position, size, and time-frequency resources) and SUL configuration parameters (e.g., the SUL position as well as SUL CI payload size and time-frequency resources) may be provided to the UE under a common, parent RRC parameter.

In a second aspect, the UE may not receive additional RRC parameters from the base station for SUL. Instead, the UE may determine the SUL configuration parameters based at least in part on the NUL configuration parameters. In one example, the SUL and NUL may share the same number of bits. For instance, the fields of NUL and SUL in the ULCI may be configured to have the same bit-width, which both may follow from the existing NUL size parameter (e.g., CI-PayloadSize or another name). Thus, referring to FIG. 6, the UE may determine that the SUL CI payload size parameter (e.g., number of bits) corresponding to block six 608 is the same as the NUL size parameter configured for block two 606.

In another example, the frequency domain resources covered by ULCI for SUL may be configured to correspond to the whole, active uplink bandwidth part (BWP) configured for the UE in SUL. Alternatively, the frequency domain resources for SUL may be configured to correspond to the entire SUL bandwidth. Thus, referring to FIG. 6, the UE may determine that the set of frequency domain resources associated with block six 608 for SUL corresponds to a configured BWP (e.g., the active BWP) for SUL, or the configured SUL bandwidth. In contrast, the frequency domain resources configured for NUL (e.g., as provided by the parameter timeFrequencyRegion or another name) may not be used for SUL, as NUL and SUL occupy different frequencies.

In a further example, the time domain resources covered by the SUL may be configured to have a duration equal in time to that of the NUL. Thus, referring to FIG. 6, the UE may determine that the SUL time domain resources configured for block six 608 have a duration equal to that of the NUL time domain resources configured for block two 606. Additionally, the UE may determine the SUL time domain resources based on the UE's monitoring periodicity of ULCI. For example, when the UE's monitoring periodicity of ULCI is greater than or equal to one slot (e.g., the UE monitors for ULCI in SUL every one or more slots), the duration of the SUL time domain resources may be equal to the monitoring periodicity. Thus, in the example of FIG. 6, if the UE monitors for block six 608 every two slots, the duration of the SUL time domain resources may be configured to also be two slots. However, when the UE's monitoring periodicity of ULCI is less than one slot, a number of symbols configured for the ULCI (e.g., as provided by the parameter timeFrequencyRegion or another name) may apply both to NUL and SUL when NUL and SUL overlap in time. For instance, in the example of FIG. 6, if the UE monitors for block six 608 every five symbols, the duration of the SUL time domain resources (and NUL time domain resources) may configured to also be five symbols. The number of symbols may be based on (e.g., in a unit of) the subcarrier spacing (SCS) for downlink transmissions.

In an additional example, the same time domain granularity may apply to both the SUL and the NUL. For instance, the SUL time domain granularity may be configure d to be the same as the configured NUL time domain granularity (e.g., time GranularityforCI or another name). Thus, referring to FIG. 6, the UE may determine that the SUL time domain granularity associated with block six 608 is the same as the NUL time domain granularity associated with block two 606.

In a third aspect, the UE may determine the SUL configuration parameters based on whether or not additional RRC parameters are received from the base station for ULCI in SUL. For example, if each of the SUL CI payload size parameter (e.g., CI-PayloadSize-forSUL or another name) and SUL indication of time-frequency resources (e.g., time-FrequencyRegion-forSUL or another name) are configured by the base station and received by the UE, then the UE may determine the SUL configuration parameters from the received RRC parameters as described above (with respect to the first aspect). Otherwise, if the UE does not receive certain RRC parameters, the UE may determine the corresponding SUL configuration parameters from the NUL configuration parameters as described above (with respect to the second aspect). The RRC parameters may include, for example, the frequency domain resources, the number of bits, the total time duration, the time domain granularity, and/or an uplink cancelation priority.

Figure 7:
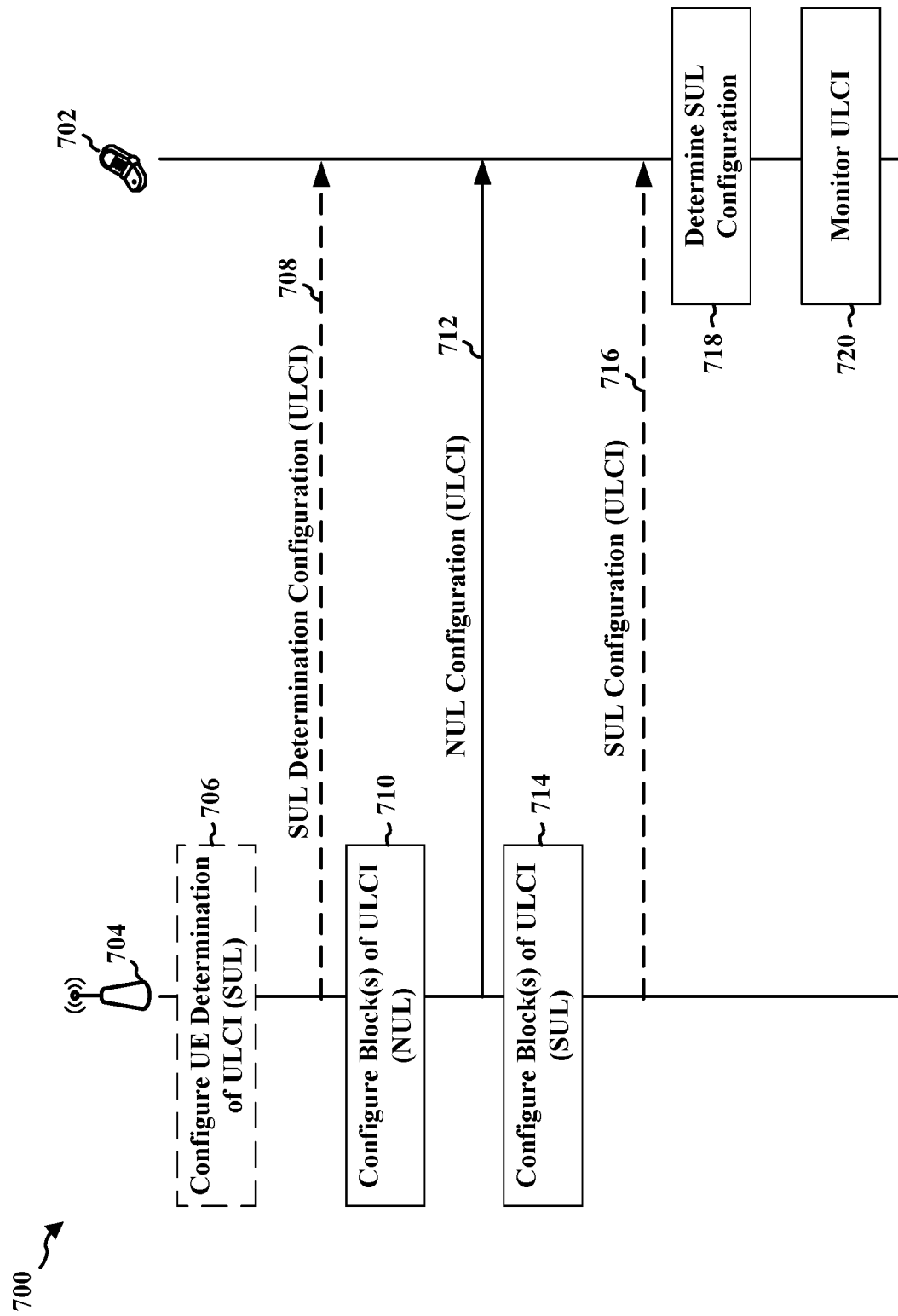
FIG. 7 is an example call flow diagram between a UE and a base station.

FIG. 7 illustrates an example call flow diagram 700 between a UE 702 and a base station 704. At block 706, the base station may configure the rules for the UE to determine the SUL configuration parameters for ULCI, in accordance with the third aspect described above with respect to FIG. 6. For example, the base station may configure the UE to determine the SUL configuration from separate RRC parameters configured for the SUL carrier and transmitted to the UE, in accordance with the first aspect described above with respect to FIG. 6. Alternatively, the base station may configure the UE to determine the SUL configuration parameters based on the NUL configuration parameters, without configuring separate RRC parameters for ULCI in SUL, in accordance with the second aspect described above with respect to FIG. 6. After configuring these rules, the base station may transmit the configuration rules 708 for the UE to determine the SUL configuration. Alternatively, the UE may be preconfigured with these rules.

At block 710, the base station may configure NUL configuration parameters associated with a block of ULCI. For example, the base station may configure the UE with a corresponding location of fields in the DCI for NUL (e.g., a NUL position parameter), a number of bits for applying the ULCI (e.g., a NUL size parameter), and an indication for time-frequency resources of the ULCI (e.g., a NUL indication of time and frequency domain resources), including a set of frequency domain resources on the serving cell, a number of consecutive symbols, and a time domain granularity of each bit in the field. The base station may then transmit to the UE 702 the NUL configuration parameters 712.

At block 714, the base station may configure SUL configuration parameters associated with another block of ULCI. For example, the base station may configure a separate time/frequency region (e.g., a SUL indication of time-frequency resources) and a number of bits for the SUL (e.g., a SUL CI payload size parameter) as additional RRC parameters separate from those of the NUL. The base station may transmit the SUL configuration 716 including the additional RRC parameters to the UE 702.

Alternatively, the base station may not configure additional RRC parameters for SUL. Instead, at block 714, the base station may configure one or more SUL configuration parameters based on the NUL configuration parameters. In one example, the fields of NUL and SUL in the ULCI may be configured to have the same bit width. In another example, the frequency domain resources covered by ULCI for SUL may be configured to correspond to the whole, active uplink bandwidth part (BWP) configured for the UE in SUL, or to correspond to the entire SUL bandwidth. In a further example, the time domain resources covered by the SUL may be configured to have a duration equal in time to that of the NUL. In an additional example, the SUL time domain granularity may be configured to be the same as the configured NUL time domain granularity.

At block 718, after the UE 702 receives the NUL configuration 712 associated with one block of the ULCI, the UE may determine the SUL configuration associated with another block of the ULCI. At block 720, the UE may monitor the ULCI based on the NUL configuration 712 and the SUL configuration. The UE 702 may determine the SUL configuration based on the configuration rules 708 (e.g., preconfigured or provided by the base station 704) in accordance with either the first aspect or the second aspect described above. For example, if the UE receives SUL configuration 716 including additional RRC parameters associated with SUL, the UE may monitor for and apply ULCI to SUL based on those separate RRC parameters (e.g., the SUL indication of time-frequency resources and the SUL CI payload size parameter). Alternatively, if the UE does not receive SUL configuration 716, or does not receive some parameters in SUL configuration 716, the UE may monitor for and apply ULCI to SUL based on the corresponding parameters in the NUL configuration 712. For example, the UE may determine that the SUL CI payload size parameter is the same as the NUL size parameter, determine that the set of frequency domain resources corresponds to a configured BWP for SUL or the configured SUL bandwidth, determine that the SUL time domain resources have a duration equal to that of the NUL time domain resources, or determine that the SUL time domain granularity is the same as the NUL time domain granularity.

Figure 8:
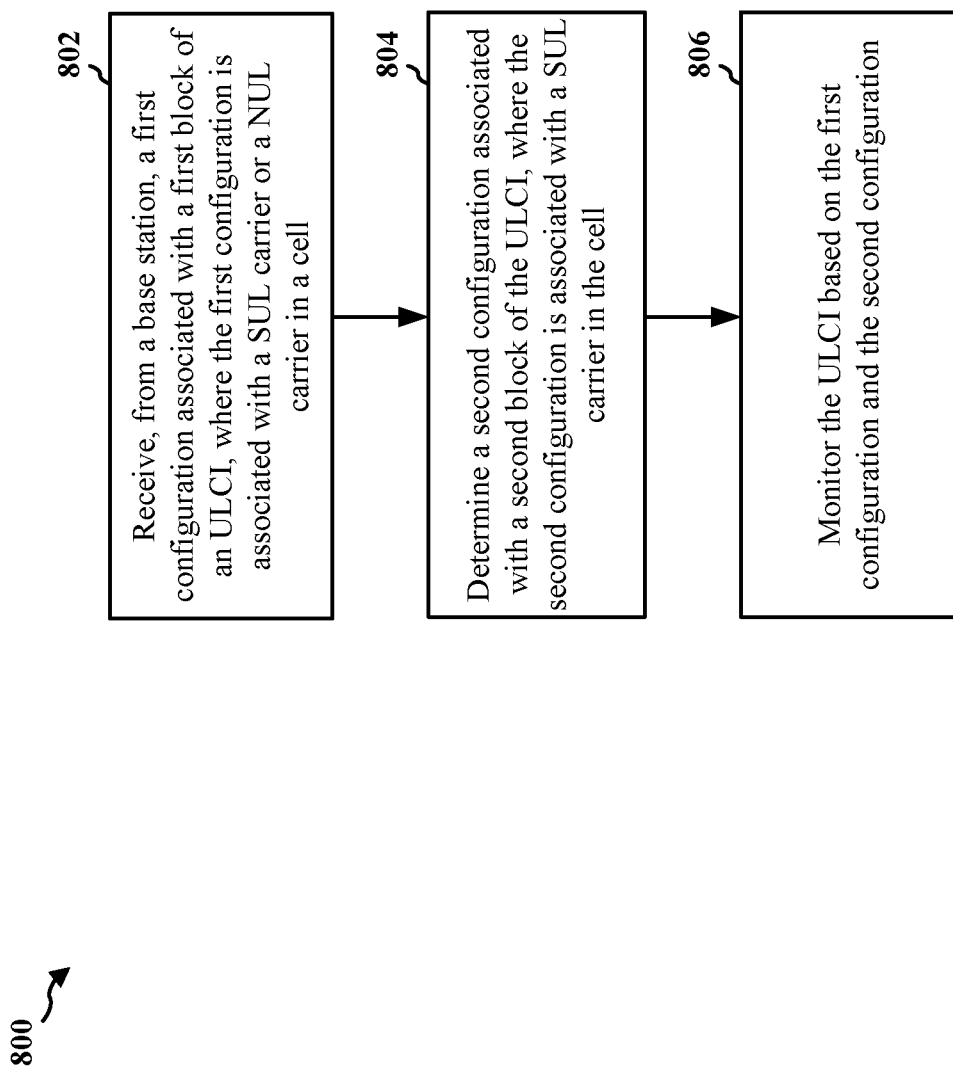
FIG. 8 is a flowchart of a method of wireless communication of a UE.

FIG. 8 is a flowchart 800 of a method of wireless communication. The method may be performed by a UE or a component of a UE (e.g., the UE 104, 350, 504, 702; the apparatus 1002). Optional aspects are illustrated in dashed lines. The method allows a UE to determine a SUL configuration to determine the subset of resources for cancelling uplink communications in SUL. The methods described herein can provide a number of benefits, such as improving communication signaling, resource utilisation, and/or power savings.

At 802, the UE receives, from a base station, a first configuration associated with a first block of an ULCI, where the first configuration is associated with at least one of a SUL carrier or a NUL carrier in a cell. For example, referring to FIG. 7, the UE 702 may receive the NUL configuration 712 associated with one block of the ULCI. Further, 802 may be performed by 1040 in FIG. 10.

At 804, the UE determines a second configuration associated with a second block of the ULCI, where the second configuration is associated with a SUL carrier in the cell. For example, referring to FIG. 7, at block 718, after the UE 702 receives the NUL configuration 712 associated with one block of the ULCI, the UE may determine the SUL configuration associated with another block of the ULCI. Further, 804 may be performed by 1040 in FIG. 10.

In the first aspect, the second configuration may be determined from RRC parameters received from the base station and associated with the SUL carrier. The first configuration may include a NUL size parameter indicating a first number of bits associated with the first block, and a NUL indication of time-frequency resources associated with the first block. The second configuration may include a SUL CI payload size parameter indicating a second number of bits associated with the second block, and a SUL indication of time-frequency resources associated with the second block. The SUL CI payload size parameter and the SUL indication may be separate RRC parameters from the NUL size parameter and the NUL indication. The first configuration and the second configuration may be configured under a same (parent) RRC parameter.

In the second aspect, the second configuration may be determined based on the first configuration received from the base station. In one example, the first configuration may include a NUL size parameter indicating a first number of bits associated with the first block, the second configuration may include a SUL CI payload size parameter indicating a second number of bits associated with the second block, and the SUL CI payload size parameter may be the same as the NUL size parameter. In another example, the second configuration may include a set of SUL frequency resources, and the SUL frequency resources may include one of a BWP on the SUL or a bandwidth of the SUL. In a further example, the first configuration may include a first indication of NUL time domain resources associated with the first block, the second configuration may include a second indication of SUL time domain resources associated with the second block, and a NUL duration of the NUL time domain resources may be the same as a SUL duration of the SUL time domain resources. The SUL duration may be equal to a ULCI monitoring periodicity of the UE when the ULCI monitoring periodicity is at least one slot, and the SUL duration may be equal to a configured number of symbols when the ULCI monitoring periodicity is less than one slot. In an additional example, the first configuration may include a NUL time domain granularity associated with the first block, the second configuration may include a SUL time domain granularity associated with the second block, and the NUL time domain granularity may be the same as the SUL time domain granularity. In another example, the first configuration may include a first indication of uplink cancelation priority on the NUL associated with the first block, the second configuration may include a second indication of uplink cancelation priority on the SUL associated with the second block, and the uplink cancelation priority on the NUL may be the same as the uplink cancelation priority on the SUL.

In the third aspect, the second configuration may be determined from RRC parameters associated with the SUL carrier when the RRC parameters are configured by the base station, and the second configuration may be determined based on the first configuration when the RRC parameters are not configured. The RRC parameters associated with the SUL carrier may comprise at least one of a set of frequency domain resources, a number of bits, a total duration of time domain resources, or a time domain granularity.

At 806, the UE monitors the ULCI based on the first configuration and the second configuration. The ULCI may be monitored based on the second configuration based on a radio resource control (RRC) parameter received from the base station. For example, referring to FIG. 7, at block 720, the UE may monitor the ULCI based on the NUL configuration 712 and the SUL configuration. For example, referring to the example of FIG. 6, a UE may monitor for block two 606 based on the NUL position parameter received in NUL configuration 712, and, when block two 606 is received, apply ULCI across a subset of NUL resources based on the other NUL configuration parameters. Similarly, a UE may monitor for block six 608 based on the SUL position parameter received in SUL configuration 716, and when block six 608 is received, apply ULCI across a subset of SUL resources based on the determined SUL configuration parameters. Alternatively, if the UE does not receive the SUL position parameter, the UE may refrain from determining the SUL parameters and monitoring the ULCI for SUL. Further, 806 may be performed by 1040 in FIG. 10.

Figure 9:
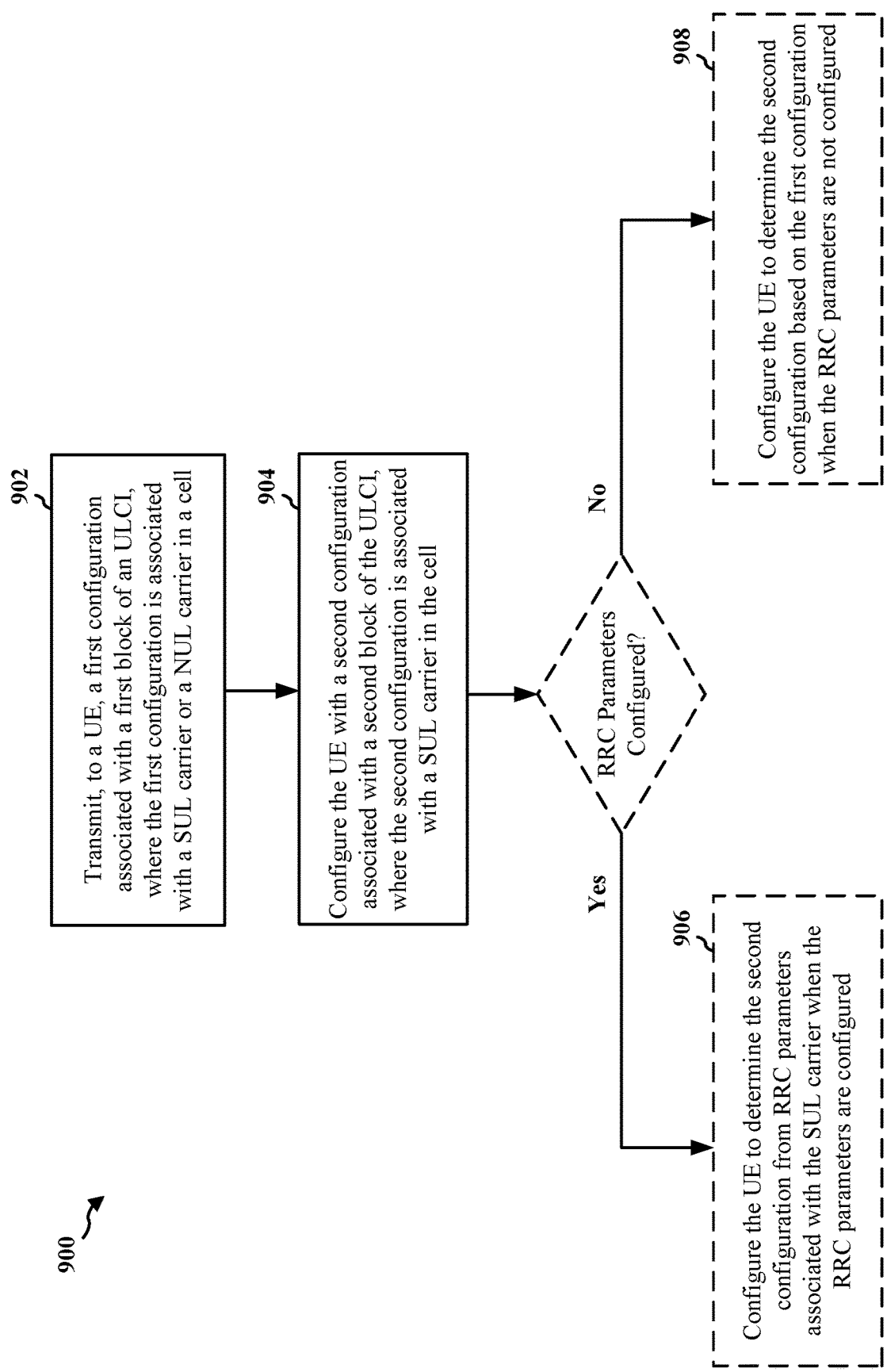
FIG. 9 is a flowchart of a method of wireless communication of a base station.

FIG. 9 is a flowchart 900 of a method of wireless communication. The method may be performed by a base station or a component of a base station (e.g., the base station 102/180, 310, 502, 704; the apparatus 1102). Optional aspects are illustrated in dashed lines. The method allows a base station to configure a UE to determine a SUL configuration to determine the subset of resources for cancelling uplink communications in SUL. The methods described herein can provide a number of benefits, such as improving communication signaling, resource utilisation, and/or power savings.

At 902, the base station transmits, to the UE, a first configuration associated with a first block of an ULCI, where the first configuration is associated with at least one of a SUL carrier or a NUL carrier in a cell. For example, referring to FIG. 7, the base station 704 may transmit the NUL configuration 712 associated with one block of the ULCI to the UE 702. Further, 902 may be performed by 1140 in FIG. 11.

At 904, the base station configures the UE with a second configuration associated with a second block of the ULCI, where the second configuration is associated with a SUL carrier in the cell. For example, referring to FIG. 7, at block 714, the base station configures SUL configuration parameters associated with another block of ULCI. Further, 904 may be performed by 1140 in FIG. 11.

In the first aspect, the second configuration includes RRC transmitted to the UE and associated with the SUL carrier. The first configuration may include a NUL size parameter indicating a first number of bits associated with the first block, and a NUL indication of time-frequency resources associated with the first block. The second configuration may include a SUL CI payload size parameter indicating a second number of bits associated with the second block, and a SUL indication of time-frequency resources associated with the second block. The SUL CI payload size parameter and the SUL indication may be separate RRC parameters from the NUL size parameter and the NUL indication. The first configuration and the second configuration may be configured under a same (parent) RRC parameter.

In the second aspect, the second configuration may be configured based on the first configuration transmitted to the UE. In one example, the first configuration may include a NUL size parameter indicating a first number of bits associated with the first block, the second configuration may include a SUL CI payload size parameter indicating a second number of bits associated with the second block, and the SUL CI payload size parameter may be the same as the NUL size parameter. In another example, the second configuration may include a set of SUL frequency resources, and the SUL frequency resources may include one of a BWP on the SUL or a bandwidth of the SUL. In a further example, the first configuration may include a first indication of NUL time domain resources associated with the first block, the second configuration may include a second indication of SUL time domain resources associated with the second block, and a NUL duration of the NUL time domain resources may be the same as a SUL duration of the SUL time domain resources. The SUL duration may be equal to a ULCI monitoring periodicity of the UE when the ULCI monitoring periodicity is at least one slot, and the SUL duration may be equal to a configured number of symbols when the ULCI monitoring periodicity is less than one slot. In an additional example, the first configuration may include a NUL time domain granularity associated with the first block, the second configuration may include a SUL time domain granularity associated with the second block, and the NUL time domain granularity may be the same as the SUL time domain granularity. In another example, the first configuration may include a first indication of uplink cancelation priority on the NUL associated with the first block, the second configuration may include a second indication of uplink cancelation priority on the SUL associated with the second block, and the uplink cancelation priority on the NUL may be the same as the uplink cancelation priority on the SUL.

In the third aspect, at 906, the base station may configure the UE to determine the second configuration from RRC parameters associated with the SUL carrier when the RRC parameters are configured by the base station. At 908, the base station may configure the UE to determine the second configuration based on the first configuration when the RRC parameters are not configured. The RRC parameters associated with the SUL carrier may comprise at least one of a set of frequency domain resources, a number of bits, a total duration of time domain resources, or a time domain granularity. For example, referring to FIG. 7, at block 706, the base station may configure the rules for the UE to determine the SUL configuration parameters for ULCI. After configuring these rules, the base station may transmit the configuration rules 708 for the UE to determine the SUL configuration. Alternatively, the UE may be preconfigured with these rules. Further, 906 may be performed by 1140 in FIG. 11. 908 may also be performed by 1140 in FIG. 11.

Figure 10:
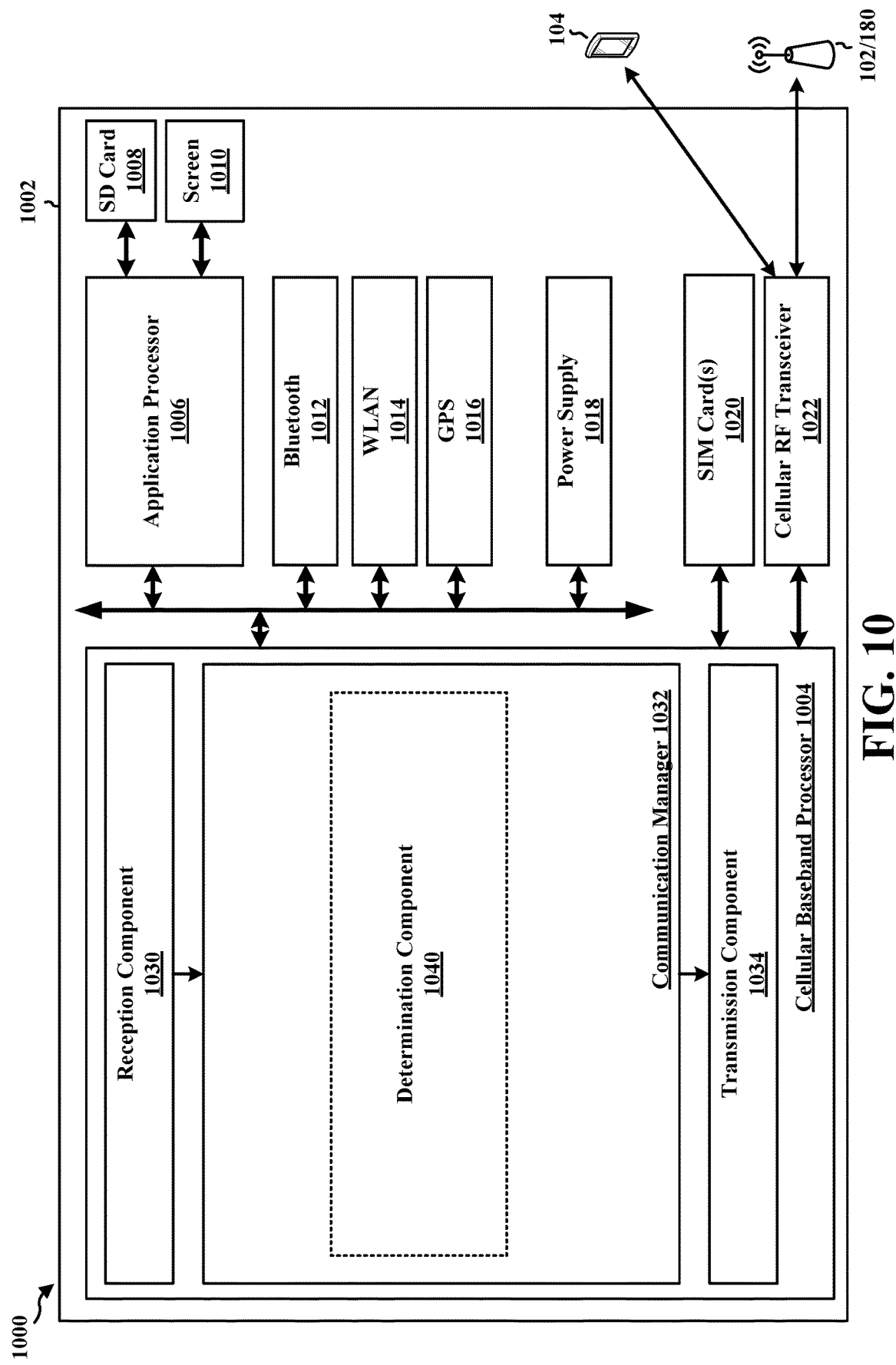
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a determination component 1040 that is configured to receive, from a base station, a first configuration associated with a first block of an uplink cancellation indication (ULCI), where the first configuration is associated with at least one of a supplementary uplink (SUL) or a non-supplementary uplink (NUL) carrier in a cell, e.g., as described in connection with 802 in FIG. 8. Determination component 1040 is also configured to determine a second configuration associated with a second block of the ULCI, where the second configuration is associated with the SUL carrier in the cell, e.g., as described in connection with 804 in FIG. 8. Determination component 1040 is also configured to monitor the ULCI based on the first configuration and the second configuration, e.g., as described in connection with 806 in FIG. 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a base station, a first configuration associated with a first block of an uplink cancellation indication (ULCI), where the first configuration is associated with at least one of a supplementary uplink (SUL) or a non-supplementary uplink (NUL) carrier in a cell; means for determining a second configuration associated with a second block of the ULCI, where the second configuration is associated with the SUL carrier in the cell; and means for monitoring the ULCI based on the first configuration and the second configuration. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
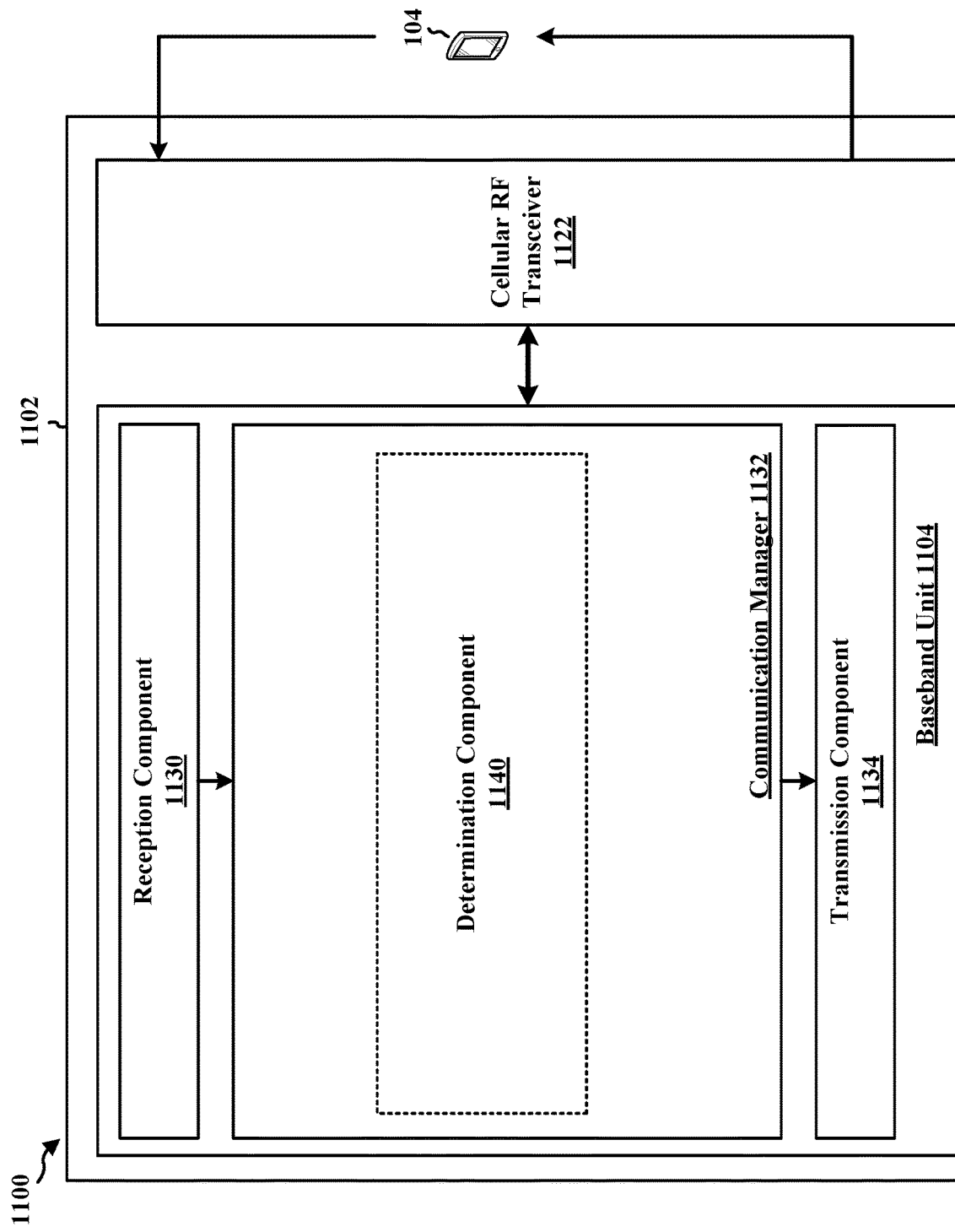
FIG. 11 is a diagram illustrating an example of a hardware implementation for an example apparatus.

FIG. 11 is a diagram 1100 illustrating an example of a hardware implementation for an apparatus 1102. The apparatus 1102 is a base station (BS) and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a determination component 1140 that is configured to transmit, to a user equipment (UE), a first configuration associated with a first block of an uplink cancellation indication (ULCI), where the first configuration is associated with at least one of a supplementary uplink (SUL) or a non-supplementary uplink (NUL) carrier in a cell, e.g., as described in connection with as described in connection with 902 in FIG. 9. Determination component 1140 is also configured to configure the UE with a second configuration associated with a second block of the ULCI, where the second configuration is associated with the SUL carrier in the cell, e.g., as described in connection with 904 in FIG. 9. Determination component 1140 is also configured to configure the UE to determine the second configuration from radio resource control (RRC) parameters associated with the SUL carrier when the RRC parameters are configured by the base station, e.g., as described in connection with 906 in FIG. 9. Determination component 1140 is also configured to configure the UE to determine the second configuration based on the first configuration when the RRC parameters are not configured, e.g., as described in connection with 908 in FIG. 9.

The apparatus may include additional components that perform each of the blocks of the algorithm in the aforementioned flowcharts of FIGS. 7 and 9. As such, each block in the aforementioned flowcharts of FIGS. 7 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting, to a user equipment (UE), a first configuration associated with a first block of an uplink cancellation indication (ULCI), where the first configuration is associated with at least one of a supplementary uplink (SUL) or a non-supplementary uplink (NUL) carrier in a cell; means for configuring the UE with a second configuration associated with a second block of the ULCI, where the second configuration is associated with the SUL carrier in the cell; means for configuring the UE to determine the second configuration from radio resource control (RRC) parameters associated with the SUL carrier when the RRC parameters are configured by the base station; and means for configuring the UE to determine the second configuration based on the first configuration when the RRC parameters are not configured. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE). The method includes receiving, from a base station, a first configuration associated with a first block of an uplink cancellation indication (ULCI), where the first configuration is associated with at least one of a supplementary uplink (SUL) carrier or a non-supplementary uplink (NUL) carrier in a cell; determining a second configuration associated with a second block of the ULCI, where the second configuration is associated with the SUL carrier in the cell; and monitoring the ULCI based on the first configuration and the second configuration.

Aspect 2 is the method of aspect 1, where the second configuration is determined from radio resource control (RRC) parameters received from the base station and associated with the SUL carrier.

Aspect 3 is the method of any of aspects 1 and 2, where the first configuration includes a NUL size parameter indicating a first number of bits associated with the first block, and a NUL indication of time-frequency resources associated with the first block; and where the second configuration includes a SUL cancellation indication (CI) size parameter indicating a second number of bits associated with the second block, and a SUL indication of time-frequency resources associated with the second block.

Aspect 4 is the method of any of aspects 1 to 3, where the SUL CI payload size parameter and the SUL indication are separate RRC parameters from the NUL size parameter and the NUL indication.

Aspect 5 is the method of any of aspects 1 to 4, where the first configuration and the second configuration are configured under a same RRC parameter.

Aspect 6 is the method of any of aspects 1 to 5, where the second configuration is determined based on the first configuration received from the base station.

Aspect 7 is the method of any of aspects 1 to 6, where the first configuration includes a NUL size parameter indicating a first number of bits associated with the first block; where the second configuration includes a SUL cancellation indication (CI) size parameter indicating a second number of bits associated with the second block; and where the SUL CI payload size parameter is the same as the NUL size parameter.

Aspect 8 is the method of any of aspects 1 to 7, where the second configuration includes a set of SUL frequency resources, and the SUL frequency resources include one of a bandwidth part (BWP) on the SUL or a bandwidth of the SUL.

Aspect 9 is the method of any of aspects 1 to 8, where the first configuration include s a first indication of NUL time domain resources associated with the first block; where the second configuration includes a second indication of SUL time domain resources associated with the second block; and where a NUL duration of the NUL time domain resources is the same as a SUL duration of the SUL time domain resources.

Aspect 10 is the method of any of aspects 1 to 9, where the SUL duration is equal to a ULCI monitoring periodicity of the UE when the ULCI monitoring periodicity is at least one slot; and where the SUL duration is equal to a configured number of symbols when the ULCI monitoring periodicity is less than one slot.

Aspect 11 is the method of any of aspects 1 to 10, where the first configuration includes a NUL time domain granularity associated with the first block; where the second configuration includes a SUL time domain granularity associated with the second block; and where the NUL time domain granularity is the same as the SUL time domain granularity.

Aspect 12 is the method of any of aspects 1 to 11, where the first configuration includes a first indication of uplink cancelation priority on the NUL associated with the first block; where the second configuration includes a second indication of uplink cancelation priority on the SUL associated with the second block; and where the uplink cancelation priority on the NUL is the same as the uplink cancelation priority on the SUL.

Aspect 13 is the method of any of aspects 1 to 12, where the second configuration is determined from radio resource control (RRC) parameters associated with the SUL carrier when the RRC parameters are configured by the base station; and where the second configuration is determined based on the first configuration when the RRC parameters are not configured.

Aspect 14 is the method of any of aspects 1 to 13, where the RRC parameters associated with the SUL carrier comprise at least one of a set of frequency domain resources, a number of bits, a total duration of time domain resources, a time domain granularity, or an uplink cancelation priority.

Aspect 15 is the method of any of aspects 1 to 14, where the ULCI is monitored based on the second configuration based on a radio resource control (RRC) parameter received from the base station.

Aspect 16 is an apparatus for wireless communication including means for implementing a method as in any of aspects 1 to 15.

Aspect 17 is an apparatus for wireless communication including at least one processor coupled to a memory and configured to implement a method as in any of aspects 1 to 15.

Aspect 18 is a computer-readable medium storing computer executable code, where the code when executed by a processor causes the processor to implement a method as in any of aspects 1 to 15.

Aspect 19 is a method of wireless communication of a base station. The method includes transmitting, to a user equipment (UE), a first configuration associated with a first block of an uplink cancellation indication (ULCI), where the first configuration is associated with at least one of a supplementary uplink (SUL) carrier or a non-supplementary uplink (NUL) carrier in a cell; and configuring the UE with a second configuration associated with a second block of the ULCI, where the second configuration is associated with the SUL carrier in the cell.

Aspect 20 is the method of aspect 19, where the second configuration includes radio resource control (RRC) parameters transmitted to the UE and associated with the SUL carrier.

Aspect 21 is the method of any of aspects 19 and 20, where the first configuration includes a NUL size parameter indicating a first number of bits associated with the first block, and a NUL indication of time-frequency resources associated with the first block; and where the second configuration includes a SUL cancellation indication (CI) size parameter indicating a second number of bits associated with the second block, and a SUL indication of time-frequency resources associated with the second block.

Aspect 22 is the method of any of aspects 19 to 21, where the SUL CI payload size parameter and the SUL indication are separate RRC parameters from the NUL size parameter and the NUL indication.

Aspect 23 is the method of any of aspects 19 to 22, where the first configuration and the second configuration are configured under a same RRC parameter.

Aspect 24 is the method of any of aspects 19 to 23, where the second configuration is configured based on the first configuration transmitted to the UE.

Aspect 25 is the method of any of aspects 19 to 24, where the first configuration includes a NUL size parameter indicating a first number of bits associated with the first block; where the second configuration includes a SUL cancellation indication (CI) size parameter indicating a second number of bits associated with the second block; and where the SUL CI payload size parameter is the same as the NUL size parameter.

Aspect 26 is the method of any of aspects 19 to 25, where the second configuration includes a set of SUL frequency resources, and the SUL frequency resources include one of a bandwidth part (BWP) on the SUL or a bandwidth of the SUL.

Aspect 27 is the method of any of aspects 19 to 26, where the first configuration includes a first indication of NUL time domain resources associated with the first block; where the second configuration includes a second indication of SUL time domain resources associated with the second block; and where a NUL duration of the NUL time domain resources is the same as a SUL duration of the SUL time domain resources.

Aspect 28 is the method of any of aspects 19 to 27, where the SUL duration is equal to a ULCI monitoring periodicity of the UE when the ULCI monitoring periodicity is at least one slot; and where the SUL duration is equal to a configured number of symbols when the ULCI monitoring periodicity is less than one slot.

Aspect 29 is the method of any of aspects 19 to 28, where the first configuration includes a NUL time domain granularity associated with the first block; where the second configuration includes a SUL time domain granularity associated with the second block; and where the NUL time domain granularity is the same as the SUL time domain granularity.

Aspect 30 is the method of any of aspects 19 to 29, where the first configuration includes a first indication of uplink cancelation priority on the NUL associated with the first block; where the second configuration includes a second indication of uplink cancelation priority on the SUL associated with the second block; and where the uplink cancelation priority on the NUL is the same as the uplink cancelation priority on the SUL.

Aspect 31 is the method of any of aspects 19 to 30, further comprising configuring the UE to determine the second configuration from radio resource control (RRC) parameters associated with the SUL carrier when the RRC parameters are configured by the base station; and configuring the UE to determine the second configuration based on the first configuration when the RRC parameters are not configured.

Aspect 32 is the method of any of aspects 19 to 31, where the RRC parameters associated with the SUL carrier comprise at least one of a set of frequency domain resources, a number of bits, a total duration of time domain resources, a time domain granularity, or an uplink cancelation priority.

Aspect 33 is an apparatus for wireless communication including means for implementing a method as in any of aspects 19 to 32.

Aspect 34 is an apparatus for wireless communication including at least one processor coupled to a memory and configured to implement a method as in any of aspects 19 to 32.

Aspect 35 is a computer-readable medium storing computer executable code, where the code when executed by a processor causes the processor to implement a method as in any of aspects 19 to 32.

What is claimed is:

1. A method of wireless communication of a user equipment (UE) comprising:
   receiving, from a base station, a first configuration associated with a first block of an uplink cancellation indication (ULCI), wherein the first configuration is associated with at least one of a supplementary uplink (SUL) carrier or a non-supplementary uplink (NUL) carrier in a cell;
   determining a second configuration associated with a second block of the ULCI, wherein the second configuration is associated with the SUL carrier in the cell and is determined based on the first configuration received from the base station; and
   monitoring the ULCI based on the first configuration and the second configuration.

2. The method of claim 1, wherein the second configuration is determined from radio resource control (RRC) parameters received from the base station and associated with the SUL carrier.

3. The method of claim 2,
   wherein the first configuration includes a NUL size parameter indicating a first number of bits associated with the first block, and a NUL indication of time-frequency resources associated with the first block; and
   wherein the second configuration includes a SUL cancellation indication (CI) payload size parameter indicating a second number of bits associated with the second block, and a SUL indication of time-frequency resources associated with the second block.

4. The method of claim 3, wherein the SUL CI payload size parameter and the SUL indication are separate RRC parameters from the NUL size parameter and the NUL indication.

5. The method of claim 2, wherein the first configuration and the second configuration are configured under a same RRC parameter.

6. The method of claim 1,
   wherein the first configuration includes a NUL size parameter indicating a first number of bits associated with the first block;
   wherein the second configuration includes a SUL cancellation indication (CI) payload size parameter indicating a second number of bits associated with the second block; and
   wherein the SUL CI payload size parameter is the same as the NUL size parameter.

7. The method of claim 1, wherein the second configuration includes a set of SUL frequency resources, and the SUL frequency resources include one of a bandwidth part (BWP) on the SUL or a bandwidth of the SUL.

8. The method of claim 1,
   wherein the first configuration includes a first indication of NUL time domain resources associated with the first block;
   wherein the second configuration includes a second indication of SUL time domain resources associated with the second block; and
   wherein a NUL duration of the NUL time domain resources is the same as a SUL duration of the SUL time domain resources.

9. The method of claim 8,
   wherein the SUL duration is equal to a ULCI monitoring periodicity of the UE when the ULCI monitoring periodicity is at least one slot; and
   wherein the SUL duration is equal to a configured number of symbols when the ULCI monitoring periodicity is less than one slot.

10. The method of claim 1,
    wherein the first configuration includes a NUL time domain granularity associated with the first block;
    wherein the second configuration includes a SUL time domain granularity associated with the second block; and
    wherein the NUL time domain granularity is the same as the SUL time domain granularity.

11. The method of claim 1,
    wherein the first configuration includes a first indication of uplink cancelation priority on the NUL associated with the first block;
    wherein the second configuration includes a second indication of uplink cancelation priority on the SUL associated with the second block; and
    wherein the uplink cancelation priority on the NUL is the same as the uplink cancelation priority on the SUL.

12. The method of claim 1,
    wherein the second configuration is determined from radio resource control (RRC) parameters associated with the SUL carrier when the RRC parameters are configured by the base station; and
    wherein the second configuration is determined based on the first configuration when the RRC parameters are not configured.

13. The method of claim 12, wherein the RRC parameters associated with the SUL carrier comprise at least one of a set of frequency domain resources, a number of bits, a total duration of time domain resources, a time domain granularity, or an uplink cancelation priority.

14. The method of claim 1, wherein the ULCI is monitored based on the second configuration based on a radio resource control (RRC) parameter received from the base station.

15. An apparatus for wireless communication of a user equipment (UE), comprising:
a memory; and
at least one processor coupled to the memory and configured to:
receive, from a base station, a first configuration associated with a first block of an uplink cancellation indication (ULCI), wherein the first configuration is associated with at least one of a supplementary uplink (SUL) carrier or a non-supplementary uplink (NUL) carrier in a cell;
determine a second configuration associated with a second block of the ULCI, wherein the second configuration is associated with the SUL carrier in the cell and is based on the first configuration received from the base station; and
monitor the ULCI based on the first configuration and the second configuration.

16. An apparatus for wireless communication of a user equipment (UE), comprising:
means for receiving, from a base station, a first configuration associated with a first block of an uplink cancellation indication (ULCI), wherein the first configuration is associated with at least one of a supplementary uplink (SUL) carrier or a non-supplementary uplink (NUL) carrier in a cell;
means for determining a second configuration associated with a second block of the ULCI, wherein the second configuration is associated with the SUL carrier in the cell and is based on the first configuration received from the base station; and
means for monitoring the ULCI based on the first configuration and the second configuration.

17. A non-transitory computer-readable medium storing computer executable code, the code when executed by a processor causes the processor to:
receive, from a base station, a first configuration associated with a first block of an uplink cancellation indication (ULCI), wherein the first configuration is associated with at least one of a supplementary uplink (SUL) carrier or a non-supplementary uplink (NUL) carrier in a cell;
determine a second configuration associated with a second block of the ULCI, wherein the second configuration is associated with the SUL carrier in the cell and is based on the first configuration received from the base station; and
monitor the ULCI based on the first configuration and the second configuration.

18. A method of wireless communication of a base station comprising:
transmitting, to a user equipment (UE), a first configuration associated with a first block of an uplink cancellation indication (ULCI), wherein the first configuration is associated with at least one of a supplementary uplink (SUL) carrier or a non-supplementary uplink (NUL) carrier in a cell; and
configuring the UE with a second configuration associated with a second block of the ULCI and based on the first configuration transmitted to the UE, wherein the second configuration is associated with the SUL carrier in the cell.

19. The method of claim 18, wherein the second configuration includes radio resource control (RRC) parameters transmitted to the UE and associated with the SUL carrier.

20. The method of claim 19,
wherein the first configuration includes a NUL size parameter indicating a first number of bits associated with the first block, and a NUL indication of time-frequency resources associated with the first block; and
wherein the second configuration includes a SUL cancellation indication (CI) payload size parameter indicating a second number of bits associated with the second block, and a SUL indication of time-frequency resources associated with the second block.

21. The method of claim 20, wherein the SUL CI payload size parameter and the SUL indication are separate RRC parameters from the NUL size parameter and the NUL indication.

22. The method of claim 19, wherein the first configuration and the second configuration are configured under a same RRC parameter.

23. The method of claim 18,
wherein the first configuration includes a NUL size parameter indicating a first number of bits associated with the first block;
wherein the second configuration includes a SUL cancellation indication (CI) payload size parameter indicating a second number of bits associated with the second block; and
wherein the SUL CI payload size parameter is the same as the NUL size parameter.

24. The method of claim 18, wherein the second configuration includes a set of SUL frequency resources, and the SUL frequency resources include one of a bandwidth part (BWP) on the SUL or a bandwidth of the SUL.

25. The method of claim 18,
wherein the first configuration includes a first indication of NUL time domain resources associated with the first block;
wherein the second configuration includes a second indication of SUL time domain resources associated with the second block; and
wherein a NUL duration of the NUL time domain resources is the same as a SUL duration of the SUL time domain resources.

26. The method of claim 25,
wherein the SUL duration is equal to a ULCI monitoring periodicity of the UE when the ULCI monitoring periodicity is at least one slot; and
wherein the SUL duration is equal to a configured number of symbols when the ULCI monitoring periodicity is less than one slot.

27. The method of claim 18,
wherein the first configuration includes a NUL time domain granularity associated with the first block;
wherein the second configuration includes a SUL time domain granularity associated with the second block; and
wherein the NUL time domain granularity is the same as the SUL time domain granularity.

28. The method of claim 18,
wherein the first configuration includes a first indication of uplink cancelation priority on the NUL associated with the first block;
wherein the second configuration includes a second indication of uplink cancelation priority on the SUL associated with the second block; and
wherein the uplink cancelation priority on the NUL is the same as the uplink cancelation priority on the SUL.

29. The method of claim 18, further comprising:
configuring the UE to determine the second configuration from radio resource control (RRC) parameters associated with the SUL carrier when the RRC parameters are configured by the base station; and
configuring the UE to determine the second configuration based on the first configuration when the RRC parameters are not configured.

30. The method of claim 29, wherein the RRC parameters associated with the SUL carrier comprise at least one of a set of frequency domain resources, a number of bits, a total duration of time domain resources, a time domain granularity, or an uplink cancelation priority.

31. An apparatus for wireless communication of a base station, comprising:
a memory; and
at least one processor coupled to the memory and configured to:
transmit, to a user equipment (UE), a first configuration associated with a first block of an uplink cancellation indication (ULCI), wherein the first configuration is associated with at least one of a supplementary uplink (SUL) carrier or a non-supplementary uplink (NUL) carrier in a cell; and
configure the UE with a second configuration associated with a second block of the ULCI and based on the first configuration transmitted to the UE, wherein the second configuration is associated with the SUL carrier in the cell.

32. An apparatus for wireless communication of a base station, comprising:
means for transmitting, to a user equipment (UE), a first configuration associated with a first block of an uplink cancellation indication (ULCI), wherein the first configuration is associated with at least one of a supplementary uplink (SUL) carrier or a non-supplementary uplink (NUL) carrier in a cell; and
means for configuring the UE with a second configuration associated with a second block of the ULCI and based on the first configuration transmitted to the UE, wherein the second configuration is associated with the SUL carrier in the cell.

33. A non-transitory computer-readable medium storing computer executable code, the code when executed by a processor causes the processor to:
transmit, to a user equipment (UE), a first configuration associated with a first block of an uplink cancellation indication (ULCI), wherein the first configuration is associated with at least one of a supplementary uplink (SUL) carrier or a non-supplementary uplink (NUL) carrier in a cell; and
configure the UE with a second configuration associated with a second block of the ULCI and based on the first configuration transmitted to the UE, wherein the second configuration is associated with the SUL carrier in the cell.

* * * * *